M. E. MYERS AND M. A. J. HARPER.
CINEMATOGRAPH MACHINE.
APPLICATION FILED JAN. 30, 1918.

1,302,579.

Patented May 6, 1919.

WITNESSES:

Morton Earl Myers
Martin A. J. Harper
INVENTORS.

BY Frank T. Wentworth
their ATTORNEY.

UNITED STATES PATENT OFFICE.

MORTON EARLE MYERS AND MARTIN A. J. HARPER, OF NEW YORK, N. Y.

CINEMATOGRAPH-MACHINE.

1,302,579.     Specification of Letters Patent.     Patented May 6, 1919.

Application filed January 30, 1918. Serial No. 214,479.

*To all whom it may concern:*

Be it known that we, MORTON EARLE MYERS, a citizen of the United States, and MARTIN A. J. HARPER, a subject of the King of the United Kingdom of Great Britain and Ireland, both residing at the borough of Manhattan, city, county, and State of New York, have invented certain new and useful Improvements in Cinematograph-Machines, of which the following is a specification, reference being had therein to the accompanying drawings, which form a part thereof.

Our invention relates to cinematograph machines, and more particularly to the shutter mechanism thereof.

In cinematograph machines, it is the common practice to employ a shutter operating in synchronism with the film feeding mechanism of the machine, said shutter embodying therein a blade adapted to pass before the lens of the machine during the interval when the film is receiving movement, in order to intercept the light rays and prevent the image being projected upon the screen, during this interval. This blade which is known as the "cover blade" passes from before the lens substantially simultaneously with the stoppage of the film. When the cover blade is formed of opaque material, it is also customary to use one or more similar blades in the shutter, known as "flicker blades", which pass across the lens while the film is stationary, in order to equalize, or balance the light conditions at the screen, and reduce the sharp contrasts between the brief interval when the cover blade is operative and the screen is not illuminated, and the longer interval during which the image is being projected upon the screen. The rapid exposure of succeeding pictures upon the film, with the rapid alternate darkening and illumination of the screen, results in a condition known in this art as a "flicker", the function of the flicker blade being to increase the rapidity or frequency of such alternations to an extent to make this flicker of such short duration as to reduce the perceptible impression made upon the optic nerve.

If the cover blade does not extend across the entire lens area during the full interval while the film is receiving movement, some of the light rays passing through the lens, will pass to the screen and the movement of the film will be apparent upon the screen, the light tones and high lights of the picture being elongated with the resultant development upon the screen of light streaks, known to the art as "travel ghosts", "travel" or "ghosts" which are very much accentuated by reason of the reduction of the aggregate volume of light passing to the screen and the contrasting brilliancy of the reproduced image.

We have discovered by actual demonstration, that irrespective of the size of an opening in an otherwise opaque cover blade, or flicker blade, a full picture will be projected through this opening upon the screen, but that the definition of the picture of the sharp contrast of the tones thereof, varies with the aggregate volume of light passing through the shutter blades to the screen. We have also discovered that by permitting a reduced volume of light to pass to the screen while either the cover blade or the flicker blade is in the operative relation to the lens, which light is so diffused as to prevent an image being defined upon the screen thereby, while at the same time interrupting even these light rays with great rapidity, or high frequency, sharp contrasts between the uniform deep tones upon the screen resulting from a total absence of illumination, and the brilliancy resulting in the projection of the total volume of light rays passing through the film and the lens resulting in a flicker, are avoided. We have also discovered that under the conditions immediately above referred to, the elimination of the flicker is accompanied by a lack of contrast in the dark tones, light tones and high lights in the reproduced image, the general effect being a darkening of the lighter tones and a lightening of the darker tones, resulting in what is known as a "gray reproduction" which is undesirable. This condition, however, may be obviated by permitting a small volume of light, sufficient to accurately define the image, to pass through the shutter to the screen, thus creating a condition in which the screen is constantly illuminated, but with a varied degree of brilliancy, the basic tones of the picture of the film being always present upon the screen, whether the film is stationary or in motion. This condition, by reason of a constant illumination of the screen and the alternate interruption by, and passage of light rays through, the shutter blades, will, during the movement of the film, so control the light rays as to avoid such apparent light conditions upon the screen as will result in ghosts thereon.

With these conditions in mind, the object of our invention has been to provide a shutter mechanism for a cinematograph machine by which the screen will be constantly illuminated but with a varying degree of brilliancy, to avoid that flicker common to cinematograph machines, while avoiding a lack of contrast in the darker and lighter tones of the reproduction by permitting the image to be defined upon the screen by a small volume of light rays during the interval when the shutter blades are passing across the lens in a manner to avoid the effect of grayness in the reproduction. Furthermore, we so construct the shutter, as to permit an image to be projected upon the screen with sufficient strength to preserve the basic tones of the picture while the cover blade is in the operative relation to the lens, the volume of light defining this image upon the screen being sufficiently small to prevent such a streaking of the screen as will be apparent to the observer in the form of travel ghosts, travel or ghosts.

With a shutter made in accordance with our invention, the light conditions upon the screen are not only such as to place the eye of the observer under less strain than when using shutters with opaque cover and flicker blades, but the volume of light required to secure an effective reproduction of a picture upon the screen is less than when such opaque blades are used so that with the same consumption of light producing energy, better definition can be secured than with opaque blades, or an equally good reproduction can be secured with a lower energy consumption.

The invention consists primarily in a cinematograph machine embodying therein a shutter having a cover blade provided with a multitude of closely juxtaposed, alternate opaque and translucent portions and a transparent area, whereby a portion of the light rays are intercepted, another portion thereof is diffused without defining an image upon the screen, and other portions thereof pass through the shutter in a manner to faintly define the image upon the screen; and in such other novel features of construction and combination of parts as are hereinafter set forth and described, and more particularly pointed out in the claims hereto appended.

Referring to the drawings.

Like letters refer to like parts throughout the several views.

In the accompanying drawings, we have shown the invention as applied to a shutter of the rotating type, which is the type generally employed in projectors now in use.

In the accompanying drawings, we have shown an ordinary cinematograph machine embodying therein a lamp structure $a$, a lens box $b$ in which the feeding mechanism for the film is inclosed, and film reel cases $c$ and $d$. This mechanism is old and well known to the art and no particular construction thereof is essential to our invention.

Carried by a rotating shaft $e$ which is driven in synchronism with the film feeding mechanism is a shutter consisting of a suitable frame $f$ and a hub $g$ connected by a plurality of spokes $h$ arranged in pairs and extending from said hub to said frame. Supported between the spokes $h$ of one of said pairs is the cover blade and between the other pair is the flicker blade. It is a common practice in this art to employ either a single flicker blade or a plurality of such blades, the number of such blades being immaterial to our present invention.

In order to secure the desired operative effect of a shutter made in accordance with our invention, we so construct the cover blade as to have present therein a multitude of small opaque areas alternating with translucent areas so as to reduce the volume of light passing through the blade and cause the shutter to intermittently intercept and permit, the passage of light rays, the number of translucent areas being such as to insure a continuous illumination of the screen but with decreased brilliancy as compared with that produced by the penetration of the maximum volume of light rays emanating from the source of light as controlled by the picture. The translucent portions serve to diffuse that light which passes therethrough, in a manner to prevent a definition of the image of the picture upon the screen thereby. Since this condition, however, will result in a "gray reproduction" or an absence of the desired contrast of tones in the reproduction, we provide this cover blade with an opening or a plurality of small openings through which light, in small volume, may pass without diffusion and thus more or less faintly define the image upon the screen. By reason of the constant illumination of the screen through the translucent portions, this light will have the effect of preserving the basic tone values of the picture upon the screen, without that sharp contrast in the tones of the picture which would result in the formation of perceptible light streaks or ghosts.

Figure 1:
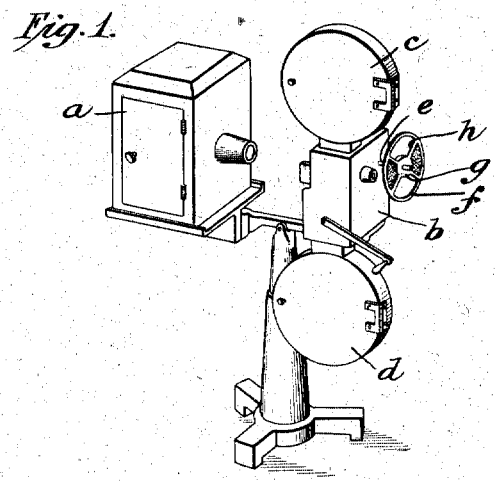
Figure 1 is a perspective view of a projector embodying a shutter made in accordance with our invention.
Figure 2:
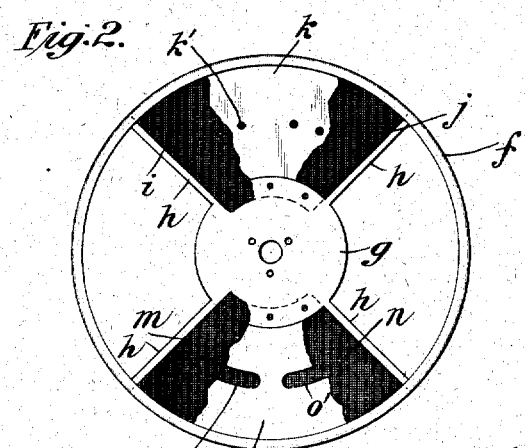
Fig. 2 is a view of one embodiment of the invention, portions thereof being broken away to disclose the structural details of the shutter;
Figure 3:
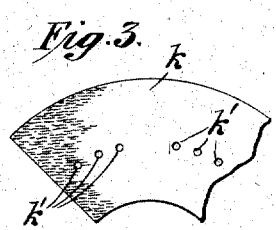
Fig. 3 is a fragmentary portion of the filler.

In the embodiment of the invention shown in Figs. 1 to 3 of the drawings, we secure this result by forming the cover blade of two plates $i$ and $j$ preferably of metal, having a multitude of small perforations therein, the material of the plates between said openings being thoroughly opaque. The openings in these plates $i$—$j$ may be in register or may be staggered in relation to each other, or if desired one of the plates may be dispensed with. Instead of perforated plates, a wire mesh or gauze may be used.

Between the plates $i$ and $j$, we employ a filler sheet $k$ which may be of any desired translucent material, having a surface so formed as to diffuse the light rays passing therethrough. We have secured highly satisfactory results by employing a thin sheet of paper impregnated with various chemical substances, which have the effect of slightly contracting the paper and making it more transparent. This filler sheet $k$ is provided with a plurality of small openings $k'$ preferably arranged concentric with the axis of the rotatable shutter, these openings being arranged adjacent the forward and rear edges of the blade (as to its direction of rotation). The openings $k'$ provide a plurality of small transparent areas, through which the light rays may freely pass, the complete picture being projected through these openings upon the screen in a manner to define the image thereon, the volume of light being such as to reduce the tones of the reproduction in a manner to eliminate the formation of perceptible ghosts by reason of the absence of contrast between the diffused light upon the screen, and the high lights and lighter tones of the reproduced image.

The construction of the flicker blade is like that of the cover blade as to the plates and the filler, the plates of the flicker blade being indicated at $m$ and $n$ respectively and the filler sheet being indicated at $o$.

Since the film is stationary when the flicker blade is operative, the possibility of the formation of ghosts in the reproduction is absent, and inasmuch as it is desirable to secure sharper contrasts in the tones of the reproduction when the flicker blade is operative than when the cover blade is operative, we provide the filler sheet $o$ with openings $o'$ corresponding in function with the openings $k'$ but being of larger area so as to permit the passage of a greater volume of light rays to the screen. We have secured the best results by making the openings $o'$ segmental in form as continuous elongated slots terminating adjacent each other and the edges of the flicker blade.

Figure 4:
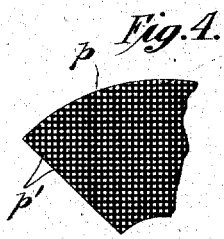
Fig. 4 is a fragmentary portion of one of the blades of the shutter embodying another form of the invention.

In the embodiment of the invention illustrated in Fig. 4, the plates $i$—$j$—$m$—$n$ are dispensed with, the opaque portions of the cover and flicker blades being formed by the superficial application to the filler sheet itself of an opaque material such as pigments of inks or paints. In this form of the invention, the filler sheet is indicated at $p$ and the opaque areas thereof at $p'$. In other respects the construction of the form of the invention in Fig. 4 would be as heretofore described. While we have found that this form of the invention gives satisfactory artistic results, this construction, however, is too fragile to give prolonged service and we therefore prefer to use metallic reinforcing plates which will hold the filler sufficiently flat to insure uniformity throughout the entire area thereof.

We prefer to use a filler made of impregnated paper, gelatin or other such material, as such produces a shutter which is fairly light in weight and gives satisfactory results.

If desired, the light effects upon the screen when either the cover or the flicker blade is in operative relation to the lens may be still further modified by using a colored filler sheet, which will give a colored effect to the reproduction. This, however, can be secured only by sacrifice of light producing energy and we prefer to use a substantially white filler sheet.

The operation of the herein described shutter is substantially as follows:—

In describing the operation of a shutter made in accordance with our invention certain conditions resulting from its use will be referred to. In many instances, however, such conditions are apparent rather than real, thus conforming to the elementary theories of a cinematograph machine, and result from limitations in the human vision rather than from actual mechanical conditions. Many of the objectionable characteristics of cinematograph machines result from persistence of vision and the inability of the human eye to register actual conditions with a rapidity commensurate with the rapidity with which such conditions change.

In the operation of a machine embodying therein a shutter made in accordance with our invention, the shutter is rotated at high speed, receiving one full revolution during the feeding movement and exposure of each picture of the film. Since the pictures are exposed to the lens opening ordinarily at the rate of sixteen per second, it follows that the speed of rotation of the shutter approaches 1000 R. P. M. Hence, the cover blade and the flicker blade, or blades, are each in an operative relation to the lens for only a very small fraction of a second, the cover blade, the flicker blade, or blades, and the intermediate clear spaces in the shutter, passing the lens successively and with great rapidity.

In describing the operation of the shutter, we will limit the description to those varying conditions present during a single revolution of a shutter. While the cover blade is passing the lens, the film will be receiving its feeding movement, and in this interval during which the cover blade is in the operative relation to the lens, a portion of the light rays, emanating from the source of light and passing through the film, will be intercepted by the opaque areas of the blade, other portions of light rays will pass through the translucent portions of the blade to the screen, and be so diffused as to prevent the projection of an image upon the screen, thereby, thus securing merely the effect of the illumination of the screen with a reduced brilliancy as compared to when the cover blade is operative, and affording a light background against which other portions of the light rays passing through the transparent areas, or openings, in the screen define the image of the picture. This definition of the image upon the screen will preserve the basic tones of the picture upon the screen, without those sharp contrasts between the high lights and lighter tones, and the shadows or deeper tones, which will make a perceptible impression upon the eye, the alternation of opaque and translucent areas in the shutter and the separation of the transparent areas, or openings, insuring uniformity in the conditions upon the screen during the entire interval when the cover blade is operative, and preventing varying light condition on different portions of the screen.

As heretofore stated, the illumination of the screen by the light passing through the translucent portions of the shutter, presents a substantially uniform light background and eliminates perceptible light streaking, or ghosts, upon the screen while the film has movement; while the projection of the image upon the screen through the transparent areas of the blade, will preserve the basic tones of the picture even though the picture is receiving movement, to an extent to prevent grayness of the reproduction in its entirety.

As the cover blade leaves the operative position as to the lens, the shutter completely uncovers the lens thus permitting the full volume of light rays, passing through the film, to be projected upon the screen. At this stage there will be a sharp contrast between the high lights and lighter tones, and the shadows or darker tones, of the reproduced picture, but the effect of the brilliancy of this reproduction upon the eye will be very much modified from the fact that while the cover blade was operative, the screen was nevertheless illuminated, but with a lesser degree of brilliancy. By reason of the fact that the basic tones of the picture are preserved upon the screen while the cover blade is operative, persistence of vision will carry these tonal effects into the interval following the operative period of the cover blade, this condition resulting in a sharp definition of the reproduced image without materially lightening the darker tones.

Immediately following the full exposure of the lens, the flicker blade becomes operative. The opaque and translucent areas of this blade will have the effect of reducing the illumination of the screen in the same manner as with the corresponding portions of the cover blade, but the increase in size of the transparent areas in this blade, will permit the image to be defined upon the screen through these areas, with a relatively greater brilliancy as to the portions of the shutter effecting the complete exposure of the lens. The modulation of the lighter effects while the flicker blade is operative will prevent a disproportionate duration of any period of greatest brilliancy in the illumination of the screen, thus tending to preserve uniformity in the light effects upon the screen throughout the entire cycle of operations of the shutter.

Following the operative interval of the flicker blade, the shutter again completely exposes the lens until the cover blade again becomes operative upon the succeeding cycle of operation.

Throughout, persistence of vision, is relied upon to secure the desired effect of the picture upon the eye of the observer, and hence the general light effects upon the screen so far as the observer is aware are substantially uniform, although, as a matter of fact, there is a constantly varying light condition at the screen. However, the screen is constantly illuminated whether the cover, or flicker blade, is in the operative relation to the lens, or not.

While we have referred to a substantial elimination of light streaking, "travel," or "ghosts" upon the screen, we do not wish to be understood as stating that these conditions are actually eliminated. In fact, with the movement of the film, the lighting effects upon the screen vary with the movement of the film. But, the background of light against which the image is projected through the transparent opening, or openings, eliminates that sharp contrast between the lighter tones and high lights, and the deeper tones and shadows, of the reproduced image, the lighter tones merging in the background to an extent to make the ghost so inconspicuous as not to make a perceptible impression upon the eye.

We have also referred to the elimination of flicker, but it is apparent that while the cover blade and flicker blade are operative in relation to the lens, there is a change of light conditions upon the screen, but this change is of degree of illumination instead of an alternate casting of a deep shadow upon, and a brilliant illumination of, the screen. With a mere variance in the degree of brilliancy of the illumination of the screen during different portions of each cycle of operations of the shutter, the change of light conditions makes no appreciable impression on the eye, and hence there is no apparent "flicker."

It is not our intention to limit the invention to the precise details of construction shown in the drawings, it being apparent that such may be varied without departing from the spirit and scope of the invention.

Having described the invention what we claim as new and desire to have protected by Letters Patent is:—

1. A cinematograph machine embodying therein a shutter having a cover blade provided with a multitude of closely juxtaposed, alternate opaque and translucent portions and a transparent area, whereby a portion of the light rays is intercepted, another portion thereof is diffused without defining an image upon the screen, and other portions thereof pass through said blade in a manner to faintly define an image upon the screen.

2. A cinematograph machine embodying therein a shutter having a cover blade and a flicker blade provided with a multitude of closely juxtaposed, alternate opaque and translucent portions and a transparent area, whereby a portion of the light rays is intercepted, another portion thereof is diffused without defining an image upon the screen, and other portions thereof pass through said flicker blade in a manner to faintly define an image upon the screen.

3. A cinematograph machine embodying therein a shutter having a cover blade and a flicker blade, each provided with a multitude of closely juxtaposed, alternate opaque and translucent portions and a transparent area, whereby a portion of the light rays is intercepted, another portion thereof is diffused without defining an image upon the screen, and other portions thereof pass through said blades in a manner to faintly define an image upon the screen.

4. A cinematograph machine embodying therein a shutter having a cover blade and a flicker blade, each provided with a mutltitude of closely juxtaposed, alternate opaque and translucent portions and a transparent area, whereby a portion of the light rays is intercepted, another portion thereof is diffused without defining an image upon the screen, and other portions thereof pass through said blades in a manner to faintly define an image upon the screen, the transparent area of the flicker blade being relatively greater than that of the cover blade.

5. A cinematograph machine embodying therein a cover blade comprising two plates of opaque material, each having a multitude of small perforations therein, and a filler of translucent material having a transparent area therein between said plates, whereby a portion of the light rays is intercepted, another portion thereof is diffused and projected upon the screen without defining an image thereon and another portion thereof passes therethrough in a manner to faintly define an image upon the screen.

6. A cinematograph machine embodying therein a cover blade comprising two plates of opaque material, each having a multitude of small perforations therein, and a filler of translucent material between said plates whereby a portion of the light rays is intercepted and another portion thereof is diffused and projected upon the screen without defining an image thereon, said filler having an opening therein, whereby a portion of the light rays pass through the said blade in a manner to faintly define an image upon the screen.

7. A cinematograph machine embodying therein a shutter having a cover blade and a flicker blade comprising two plates of opaque material, each having a multitude of small perforations therein, and a filler of translucent material between said plates whereby a portion of the light rays is intercepted and another portion thereof is diffused and projected upon the screen without defining an image thereon, said filler having an opening therein, whereby a portion of the light rays pass through the said blade in a manner to faintly define an image upon the screen.

8. A cinematograph machine embodying therein a cover blade and a flicker blade, each comprising two plates of opaque material, each having a multitude of small perforations therein, and a filler of translucent material between said plates whereby a portion of the light rays is intercepted and another portion thereof is diffused and projected upon the screen without defining an image thereon, said filler having an opening therein, whereby a portion of the light rays pass through the said blade in a manner to faintly define an image upon the screen.

9. A cinematograph machine embodying therein a cover blade and a flicker blade, each comprising two plates of opaque material, each having a multitude of small perforations therein, and a filler of translucent material between said plates whereby a portion of the light rays is intercepted and another portion thereof is diffused and projected upon the screen without defining an image thereon, said filler having an opening therein, whereby a portion of the light rays pass through the said blade in a manner to faintly define an image upon the screen, the opening in the filler of said flicker blade being of relatively greater area than that in said cover blade.

In witness whereof, we hereunto affix our signatures, in the presence of two subscribing witnesses, this 5th day of January 1918.

MORTON EARLE MYERS.
MARTIN A. J. HARPER.

Witnesses:
F. T. WENTWORTH,
BERTHA MUELLER.

Copies of this patent may be obtained for five cents each, by addressing the "Commissioner of Patents, Washington, D. C."